US004001776B2

United States Statutory Invention Registration [19]

[11] Reg. Number: H1776

Linard et al. [45] Published: Jan. 5, 1999

[54] ENZYME-CONTAINING HEAVY DUTY LIQUID DETERGENT

[76] Inventors: Jack E. Linard, 76 Sherwood Dr., Ramsey, N.J. 07446; Daniel J. Fox, 100 Rock Rd., Hawthorne, N.J. 07506

[21] Appl. No.: 470,643

[22] Filed: Jun. 6, 1995

Related U.S. Application Data

[63] Continuation of Ser. No. 241,378, May 10, 1994, abandoned, which is a continuation of Ser. No. 559,527, Jul. 19, 1990, abandoned, which is a continuation of Ser. No. 210,474, Jun. 23, 1988, abandoned.

[51] Int. Cl.[6] ..... D06M 16/00

[52] U.S. Cl. ..... 510/530; 510/531

[58] Field of Search ..... 252/174.12, 174.17, 252/135, 173, DIG. 12, DIG. 14

[56] References Cited

U.S. PATENT DOCUMENTS

| | | | |
|---|---|---|---|
| B 458,819 | 4/1976 | Weber | 242/545 |
| 4,142,999 | 3/1979 | Bloching et al. | 252/544 |
| 4,239,659 | 12/1980 | Murphy | 252/524 |
| 4,261,868 | 4/1981 | Hora et al. | 252/174.12 |
| 4,318,818 | 3/1982 | Letton et al. | 252/174.12 |
| 4,404,115 | 9/1983 | Tai | 252/174.12 |
| 4,456,544 | 6/1984 | Lupova et al. | 252/174.12 |
| 4,462,922 | 7/1984 | Boskamp | 252/174.12 |
| 4,497,718 | 2/1985 | Neiditch et al. | 252/174.12 |
| 4,507,219 | 3/1985 | Hughes | 252/118 |
| 4,518,694 | 5/1985 | Shaer | 435/188 |
| 4,528,039 | 7/1985 | Rubin et al. | 252/174.12 |
| 4,532,064 | 7/1985 | Boskamp | 252/105 |
| 4,652,394 | 3/1987 | Inamorato et al. | 252/174.12 |
| 4,670,179 | 6/1987 | Inamorato et al. | 252/174.12 |
| 4,767,562 | 8/1988 | Fry | 252/174.12 |

FOREIGN PATENT DOCUMENTS

| | | |
|---|---|---|
| 0162033 | 11/1985 | European Pat. Off. . |
| 2369338 | 5/1978 | France . |
| 2369339 | 5/1978 | France . |
| 2533601 | 2/1978 | Germany . |
| 2162242 | 3/1984 | United Kingdom . |
| 2178054 | 2/1987 | United Kingdom . |
| 2178055 | 2/1987 | United Kingdom . |

OTHER PUBLICATIONS

EP Search Report EP 89 30 6277 (no date).

Kirk Othmer Encyclopedia of Chemical Tech. (1978), vol. 4, p. 85.

Maxacal®, Technical Bulletin, International Bio–Synthetics (no date).

Savinase®, Technical Data, Novo Industri A/S (no date).

*Primary Examiner*—Stephen M. Johnson
*Assistant Examiner*—Meena Chelliah

[57] ABSTRACT

A heavy duty, enzyme-containing, aqueous liquid detergent. The detergent includes surfactants, enzymes and an enzyme-stabilizing system. The detergent has a neat liquid pH of 9.5 or greater, a solution pH or 8.5 or greater at 0.2% weight use level and a titratable alkalinity of at least 0.5% weight per gram of product when expressed as % $Na_2O$ as measured to pH 7.

31 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENZYME-CONTAINING HEAVY DUTY LIQUID DETERGENT

This is a continuation application of Ser. No. 08/241,378, filed May 10, 1994, abandoned on Sep. 15, 1995 which is a continuation application of Ser. No. 07/559,527, filed Jul. 19, 1990, now abandoned, which is a continuation application Ser. No. 07/210,474 filed Jun. 23, 1988, now abandoned on Jul. 19, 1990.

BACKGROUND OF THE INVENTION

Liquid laundry detergents provide the same performance benefits as powdered detergents such as whole wash cleaning, whitening, antiredeposition and odor removal, while providing additional benefits such as convenient dispensing, complete solubility and improved stain removal on localized stains. The improved localized cleaning is accomplished by pretreating the stain directly without the need to make a paste as with powder detergents. Liquid laundry detergents have become increasingly popular in recent years due in large part to these advantages over powders.

Liquid detergents encounter formulation difficulties over and above those seen in powders largely due to the desire to keep a wide variety of surfactants, builders and other cleaning agents solubilized for long periods in a homogeneous free flowing form. Many of the chemicals available and desirable for use in liquids are physically as well as chemically incompatible. Much of the skill utilized in formulating liquid detergents goes into keeping these chemicals stable for long periods in intimate contact with incompatible materials.

Over the last ten to twenty years, the addition of enzyme to laundry detergents for stain removal has become commonplace, particularly in Europe. Many laundry detergents now contain one or more proteolytic and/or amylolytic enzymes to improve their performance on stains that are either protein- or starch-based, such as those caused by blood, milk, grass or fruit juices. Incorporation of enzymes into powder detergents has become common, since in powders the enzymes are not in intimate contact with surfactants and other chemicals which cause degradation of the enzyme and consequent loss of enzyme activity as well as decreased effectiveness.

Incorporation of enzymes into liquid detergents remains a difficult problem despite significant improvements in enzyme stabilizing systems. The problem of enzyme stability is increased in high pH systems since the product pH acts to destabilize most common proteolytic enzymes. Many liquid laundry detergents now in the marketplace incorporate enzymes in the formulation. In all cases of which we are aware, the product pH is 8.5 or less.

Many non-enzyme liquid laundry detergents have pH's of 9.0 or greater. A high product pH is desirable because alkaline liquids give improved performance on fatty soils, both in concentrated form during pretreatment with the neat liquid, and in the wash solution where it is used at a concentration of about 0.2%. Wash solution pH's of 8.5 or greater permit improved whole wash detergency on fatty soils by saponifying the fatty materials to form an easily removed soap. Improved performance on both proteinaceous and fatty soils would result from an enzyme-containing, high pH liquid. Furthermore, because fatty soils lower wash solution pH, liquid detergents which resist drops in wash solution pH are preferred. This resistance to lowering of wash solution pH in the presence of fatty soils results from the buffering capacity provided by the detergent.

To date it has been difficult to incorporate a proteolytic enzyme in a high pH liquid and maintain acceptable enzyme stability over the long storage periods that result during the production, distribution and sale of the product.

Liquid laundry detergent systems containing some of the features described by our invention are contained in the patent literature.

Hora et al. U.S. Pat. No. 4,261,868 discloses the use of an enzyme in a high pH (7.5 to 11.0) liquid laundry detergent with a stabilizing system including a polyfunctional amino compound (such as triethanolamine) and borax. Anionic to nonionic surfactant ratios of 1:1 to 1:10 are disclosed. Example 1 includes sodium tripolyphosphate, dimethyl glycine and Alcalase® enzyme and is said to have a pH of 10.0.

Boskamp U.S. Pat. No. 4,462,922 discloses the use of a high alkaline enzyme in a liquid laundry detergent along with a stabilizing system including borax, a reducing alkali metal salt and a polyol and/or a polyfunctional amino compound. The pH of the '922 composition is said to be near neutral, preferably from 8.0 to 10.0. According to the '922 patent, the composition can be buffered to a value within that range by addition of a suitable buffer system. The pH of the wash liquor is said preferably to be 1 pH unit higher at an in-use concentration of 1%. Boskamp uses the reducing alkali metal salt to provide effective enzyme stabilization.

Boskamp U.S. Pat. No. 4,532,064 teaches the use of a high alkaline enzyme having a maximum activity at pH 8–12 in a liquid laundry detergent along with a stabilizing system including borax, a reducing metal salt, an optional buffer, and the use of a dicarboxylic acid as replacement for the polyol or polyfunctional amino compound. The pH of the final composition is near neutral, preferably 7.5 or higher and may be buffered to a value in that region by addition of a suitable buffer system. The pH of the wash water is about 1 pH unit higher at an in-use concentration of 1%. The pH of Example 1 is 7.5.

Letton et al. U.S. Pat. No. 4,318,818 discloses the use of an enzyme in a liquid laundry detergent with a stabilizing system comprising a polyol, calcium and a short chain carboxylic acid. Mono-, di-, and triethanol amines may be used as pH buffers. While Letton et al. disclose a potential product pH range of from 6.5 to 10, they prefer a range of from 7 to about 8.5 to obtain a combination of enzyme stability and detergency.

Example XIII E of Letton et al. includes Maxatase, surfactant, ethanol, sodium formate and triethanolamine, and is said to have a pH of 9.6. Example XIII P includes surfactant, ethanol, Maxatase, sodium carbonate, and sodium formate and is said to have a pH of 10.0.

Tai U.S. Pat. No. 4,404,115 teaches the use of an enzyme in a liquid laundry detergent with a stabilizing system including a polyol (optional), an alkali metal sulphite and an alkaline metal pentaborate. The pentaborate is said to provide a buffering effect on its own at the optimal pH condition to the liquid composition which on dilution in use gives a sufficiently alkaline pH for optimal detergency. The pH of the Tai wash liquor on use of the composition is said to be in the alkaline range of well above 8 at an in-use concentration of about 1%. Example III(6) discloses a metaborate and enzyme-including composition which has a pH of 11.36 and a 1% solution pH of 9.26 but an enzyme stability after 2 weeks of 10% or less. Other ingredients include surfactants + triphosphate builder.

While Tai recognizes the importance of a high wash solution pH, he generally formulates near neutral neat liquids, thus losing the pretreatment benefit of our invention.

Additionally, he teaches the use of a pentaborate rather then tetraborate (borax) (page 2, line 5).

Inamorato et al. U.S. Pat. No. 4,652,394 teaches the use of an enzyme in an aqueous laundry detergent with an enzyme stabilizing system including propylene glycol and borax. Inamorato fails to recognize the use of a high pH liquid for fatty soil removal.

In each instance cited, the prior art patents apparently fail to recognize at least one or more critical components which in combination provide the benefits of improved pretreat and whole wash efficacy on fatty soils as well as maintaining the necessary enzyme activity for removal of enzyme-susceptible stains.

The desirability of combining the properties of high alkalinity levels and inclusion of enzymes in detergent products has led to the development of alkaline protease enzymes that are specifically designed to deliver peak effectiveness in wash solutions of pH 8.5 and higher. Many powder detergents now include both high alkalinity sources and enzymes designed to function primarily in high wash solution pH systems. This has allowed the powder detergents to provide maximum benefits for detergency in two areas of primary concern to the consumer. The problem to date has been to combine these two highly desirable properties in a liquid detergent. In a high alkalinity liquid detergent enzymes are in solution at high product pH (>9.0). The high product pH is known to be detrimental to the enzyme stability over the long time periods (often at elevated temperatures) that are seen in normal product storage. We have provided a liquid detergent system which delivers the two aforementioned performance benefits while still retaining sufficient enzyme stability for effective stain removal.

Our invention involves the stable incorporation of enzymes in a high pH liquid laundry detergent and the resultant improvements in detergency on both enzyme-susceptible and fatty soils. It is the stable inclusion of the specified levels of titratable alkalinity in conjunction with an enzyme stabilization system utilizing glycols, calcium and/or borax resulting in improved proteolytic enzyme performance and excellent fatty soil removal (both in the whole wash and in pretreat usage) that forms the basis of our invention.

SUMMARY OF THE INVENTION

We have discovered a stable formulation of enzyme(s) in combination with other desirable liquid detergent components in a high alkalinity liquid laundry detergent. While many commercial products contain some of the features of our invention, and while the combined use of several products may together provide many of these features, no one liquid product has been available to date to deliver all the benefits desired by the consumer. These benefits include the convenience of a liquid, excellent fatty soil removal, both in the whole wash and in pretreatment usage, and efficient stain removal on enzyme-susceptible stains.

Our invention includes a liquid laundry detergent comprising: 1) a neat liquid pH of 9.5 or greater to provide good pretreat fatty soil removal, 2) a solution pH of 8.5 or greater at a 0.2% wt. use level to provide good whole wash detergency on fatty soils, 3) titratable alkalinity of at least 0.5% wt. per gram of product when expressed as % $Na_2O$ as measured to pH 7 for providing the buffering of the wash solution desirable for fatty soils, 4) an effective level of enzymes to provide stain removal and including at least one alkaline protease capable of providing effective stain removal when used in a wash solution of pH 8.5 or greater, and 5) an effective enzyme stabilizing system comprising components chosen from the group of known enzyme stabilizers including glycols, borax, calcium and polyfunctional amino compounds used either singly or in combination such that sufficient stability is maintained to provide effective stain removal on use.

As set forth in greater detail below, preferred systems encompassing all of the above named features comprise an active system at a level of from about 5% to about 40% wt. comprising principally anionic and nonionic surfactants, a soluble builder (such as citrate) from about 5 to about 20% wt., an alkalinity system that includes the use of one or more alkanolamines from about 1 to about 6% wt., an enzyme system containing at least one alkaline protease such as Alcalase®, Savinase®, Maxacal® or Esperase®, an enzyme stabilizing system containing a glycol at from 1 to about 8%, a boron compound, preferably borax at from about 1 to about 8% by weight and a source of alkaline earth cation provided by an alkaline earth salt (such as $CaCl_2$) at between 0.001 and 0.1% wt. expressed as the alkaline earth cation. Formate is not a necessary ingredient of the compositions of the invention. Likewise, compositions of the invention may be substantially or essentially phosphate-free. By essentially phosphate free, it is meant that there is 0.5% or less phosphorous (as phosphorous) present. Preferably, the compositions of the invention exhibit at least 25% of initial enzyme activity after 2 weeks at 105° F.

The preferred liquid detergent of this invention would additionally include hydrotrope for product stability, one or more fluorescent dyes and/or bluing agents for brightening garments, colorants and/or opacifiers for product appearance, and a fragrance to provide acceptable product odor. Advantageously, the detergent of the invention can be an isotropic, i.e., single phase, liquid. It is the stable inclusion of the aforementioned components in a liquid laundry detergent that provides both effective enzyme stain removal along with excellent fatty soil removal, both in whole wash and pretreat usage, that provides the basis for our invention.

Unless otherwise specified "pH" when used herein means the pH measured at 25° C.

DETAILED DESCRIPTION OF THE INVENTION

The liquid laundry detergents described in this invention contain the following components either as essential components or as optional ingredients: surfactants (either anionic, nonionic, cationic, zwitterionic or amphoteric or mixtures thereof) for detergency, both whole wash and pretreatment, builders for hardness ion sequestration, alkalinity/buffering agents for pH maintenance both in the neat liquid and upon dilution in the whole wash, solubilizers or hydrotropes for phase stability of the active in solution, enzymes (protease, and optionally amylase, cellulase, lipase or mixtures thereof) for stain removal, polyhydric alcohols and/or boron compounds to preserve enzyme activity upon storage, fluorescent whitening agents for whitening and brightening of clothing, softeners, foam control agents, appearance modifiers such as thickeners or opacifiers, bluing agents and colorants, germicides, perfumes and preservatives. Additional performance agents such as bleaching agents (either chlorine or oxygen bleaching), soil release agents, antiredeposition or soil suspending agents, solvents, or other minor performance components may optionally be added. Each of these components, both essential and optional, are discussed in greater detail as follows:

Surfactants

While cationic, zwitterionic or amphoteric surfactants are acceptable for use and may be considered within the scope of this invention, anionic or nonionic surfactants and mixtures thereof are more commonly used in formulating liquid laundry detergents. A ternary surfactant system of linear alkyl benzene sulfonate, linear ether sulfate and ethoxylated alcohol nonionic is especially preferred. The ratio of anionic to nonionic surfactants is preferably 1:1 to 10:1. Suitable zwitterionics and amphoteric surfactants are described in U.S. Pat. No. 4,528,039 while suitable cationic surfactants are described in U.S. Pat. No. 4,497,718, which patents are hereby incorporated by reference. The compositions of the invention may include from 1–60% by weight of one or more surfactants. The preferred anionic and nonionic surfactants are described in more detail as follows:

Anionics

Anionic surfactants comprise both soap-based and synthetic detergents. The synthetic anionic detergents can be broadly described as the water-soluble salts of organic sulfur reaction products having in their molecular structure an alkyl radical containing from about 8 to about 22 carbon atoms and a radical selected from the group consisting of sulfonic acid and sulfuric acid ester radicals. Such surfactants are well known in the detergent art and are described in "Surface Active Agents and Detergents", Vol. II, by Schwartz, Perry and Berch. Among the more useful synthetic anionics are the alkyl, alkylaryl or alkenyl sulfonates and the alkyl and alkylene ethoxy sulfates.

Suitable alkylaryl sulfonates include the alkali metal or the ammonium or alkanol ammonium salts of the alkyl aromatic sulfonates such as the higher alkylbenzene sulfonates containing from 10 to 16 carbon atoms in the alkyl groups and a straight or branched chain. Especially valuable are linear straight chain alkylbenzene sulfonates in which the average number of carbon atoms in the alkyl group is from about 10 to about 14 carbon atoms. Other useful anionic sulfonates are the olefin sulfonates including long chain alkane sulfonates, long chain hydroxyalkane sulfonates or mixtures thereof, paraffin sulfonates, alkyl glyceryl sulfonates or mixtures of these sulfonates particularly with the linear alkyl benzene sulfonates.

Suitable alkyl sulfates include those in which the alkyl chain contains from about 10 to about 18 carbon atoms and the sulfate salt is formed by a solubilizing salt forming cation such as an alkali metal (such as sodium or potassium) or ammonium or alkanolammonium compounds such as the mono, di, or triethanol ammonium salt. Suitable alkyl ethoxy sulfates include those of the formula $RP(C_2H_4O)_n SO_3M$ where R is an alkyl preferably from $C_{10}$ to $C_{16}$ chain length, n averages from 0.5 to about 10, and M is a solubilizing salt forming cation as described above for the alkyl sulfates.

Another class of anionic surfactant useful by itself or in combination with other surfactants for practice of this invention comprises the soaps. Sodium or potassium soaps are generally used with the fatty acid component or the soap derived from mixtures of saturated and partially unsaturated fatty acids in the $C_8$ to $C_{26}$ chain length region. The source of the fatty acid is traditionally a blend of coconut oil and tallow but may come from other sources such as palm oil, peanut oil or sunflower seed oil. Of course, the liquid detergents of the invention need not include soap.

The anionic surfactants as described above are employed in amounts from about 1% to about 30% by weight of the total formulation. Preferred anionic surfactant use levels are from about 2 to about 20% and may include either a single anionic surfactant or a mixture of the anionics described above. Most preferred are a mixture of anionics, each at a level of from about 4 to about 15% with a total anionic surfactant level from about 8 to about 30%.

Nonionics

Suitable nonionic surfactants are those of the formula $RO(C_2H_4O)_n$ OH where R is a $C_8$ to $C_{18}$ carbon chain or a $C_8$ to $C_{12}$ alkyl phenyl group, and n is from about 2 to about 12. Examples of suitable linear, straight chain alkyl nonionics are those sold under various Neodol names (ex Shell Chemical), those sold under various Alfonic names (ex Vista) and those sold under various Tergitol names (ex Union Carbide). The nonionic surfactants as described above are employed in amounts from about 1% to about 20% by weight of the total formula. Preferred nonionic surfactant use levels are from about 3% to about 12% and may consist of either a single nonionic surfactant or may be a mixture of the nonionics described above.

Builders

The composition of the invention may optionally include builders. Suitable builders useful in this invention include organic and inorganic builders. Examples of suitable inorganic builders are the alkali metal salts of ortho-, pyro- or tripolyphosphate, silicates or crystalline or amorphous zeolites. Examples of suitable organic builders include the alkali salts of ethylenediamine tetraacetic acid, nitrilotriacetic acid and polycarboxylic acids such as citric acid. Other examples of suitable organic builders include carbonates succinates and polymers and copolymers of maleic and acrylic acids.

The builders described above are employed in amounts from about 0.5 to 25% by weight of the total formula. Preferred builder use levels are from about 3% to about 25% especially about 5% to about 20% and may include either a single builder or may be a mixture of the builders described above.

Alkalinity/Buffering Agents

While many of the builders cited above provide a source of alkalinity in addition to their primary function of water hardness sequestration, alkalinity agents are often used in addition to the builders to provide an alkalinity reservoir to maintain a high pH and saponify the acidic constituent of soil. Suitable alkalinity sources that may be used within the scope of this invention include alkali metal hydroxides, silicates, carbonates and alkanolamines from the group consisting of monoethanolamine, diethanolamine, triethanolamine and mixtures thereof. The alkalinity agents as described above are used in amounts from 0.1% to about 10% by weight of the total formula. Preferred alkalinity agent use levels are from about 0.5% to about 8% and may consist of either a single alkalinity source or may be a mixture of the alkalinity agents described above. Most preferred alkalinity agents are the preferred alkanolamines, either individually or in mixtures, with the total alkanolamine level being from about 1% to about 6% by weight of the total formula. Monoethanolamine is particularly preferred. Levels of polyfunctional amino compounds may be from 0.5 to 10%. While the alkanolamines are preferred ingredients, the liquid detergents of the invention may be amine-free.

The total titratable alkalinity from all sources in the present compositions equals at least 0.5% wt. per gram of product when expressed as % $Na_2O$ as measured to pH 7.

Boron Compounds

Boron compounds useful in this invention include boric acid, boric oxide and alkali metal borates. Typical examples of alkali metal borates are sodium and potassium, ortho, pyro and meta borates, polyborates and borax. Borax is the preferred alkali metal borate and is a tetraborate that is sold commercially in either the pentahydrate or decahydrate form. The boron compounds are used in amounts of from 0.1% to 10% by weight of the total formula with the borax pentahydrate being the preferred compound with a use level of from about 1% to 8% by weight. It is not necessary that pentaborates be included in the compositions of the invention.

Enzymes

The enzymes to be incorporated in this compound can be proteolytic, amylolytic, lipolytic and cellulolytic enzymes as well as mixtures thereof.

Particularly suitable enzymes are alkaline proteases obtained from strains of Bacillus, having maximum activity throughout the pH range from 7.0 to 12.0. The enzymes can be incorporated in any suitable form, i.e., as granulates, marunes, prills, etc., but are more conveniently added to liquid detergents in a fluid form such as in a liquid or slurry. Examples of proteolytic enzymes suitable for use in this invention are sold under the names Alcalase®, Savinase® and Esperase® by Novo Industries, Copenhagen, Denmark and Maxatase® and Maxacal® by International Biosynthetics, Rijswijk, Netherlands. Savinase®, Maxacal®, and Alcalase® are particularly preferred.

Among the amylase enzymes suitable for use in this invention are Termamyl sold by Novo and Maxamyl sold by International Biosynthetics, Rijswijk, Netherlands.

The amount of enzyme present in the liquid composition will depend on the concentration of active enzyme in the specific product but will in general be at a level from about 0.001 to about 10% by weight. A preferred system would employ an alkaline protease, possibly in combination with an α-amylase at a total enzyme level from about 0.05 to about 5% by weight of total formula. The activity of the enzyme in the present liquid composition is preferably from 0.001 kilo Novo Protease Units (KNPU) to 1 KNPU per gram of product. One Novo Protease Unit is the amount of enzyme which hydrolyzes dimethyl casein to peptides (as determined by reaction of primary amino groups with trinitrobenzene sulfonic acid at an initial rate that corresponds to 1 micromole of glycine/minute at 50° C. and a pH of 8.3). 3 KNPU are roughly equal to 1 Anson unit. One KNPU roughly corresponds to 80,000 Alkaline Delft Units. A protease as used herein will have a minimum of 0.001 KNPU.

Polyols

Polyols useful within the scope of this invention include those polyols containing from two to six hydroxyl groups. Preferably the polyols include from one to six carbon atoms.

Typical examples include the polyhydric alcohols ethylene glycol, propylene glycol, dipropylene glycol, and glycerol. Preferred polyol use levels are from about 0.1 to about 20% of the total formula weight with most preferred levels being from about 1 to about 8% of the formula either as a single polyol or as a mixture of polyols. Obviously, polyols can likewise be used within the range of from about 0.1 to about 8% of the formula.

Alkaline Earth Salts

Any water soluble alkaline earth salt can be used as a source of cations for solution. Preferable alkaline earth salts include calcium and magnesium salts such as chlorides, sulfates and acetates.

Calcium salts are the most preferred alkaline earth salts and are used at levels of from about 0.0001% to about 1%, with a preferred range of about 0.001 to about 0.1% by weight based on the weight of the $Ca^{++}$ ion. The levels are over and above any metal iron present in the enzyme.

Hydrotropes

The term hydrotrope as used herein means an agent which will water-solubilize the main surface active agents used in the composition. Suitable hydrotropes for use in this invention include the ammonium or alkali metal salts of benzene sulfonate and mono- or dialkyl substituted benzene sulfonates wherein the alkyl chains contain 1 to 3 carbon atoms.

The alkyl benzene sulfonates include such compounds as toluene, ethyl benzene, isopropyl benzene and o-, m- and p-xylene sulfonates and mixtures thereof. Hydrotropes suitable for use in this invention may also include short chain alcohols containing from two to six carbon atoms and mixtures thereof. The hydrotropes described above are used in amounts from 1% to 15% by weight of the total formula. Preferred hydrotrope use levels are from about 2% to 10% and may include either a single hydrotrope or a mixture of the hydrotropes described above.

Fluorescent Whitening Agents

Among the fluorescent whitening agents suitable for use within the scope of this invention are the diaminostilbene disulfonate cyanuric chloride derivatives (DAS/CC).

The main constituents of the DAS/CC type fluorescent dyes are the 4,4'bis[4-anilo-6-substituted-1,3,5 triazin-2-yl) amino] stilbene-2,2' disulfonic acids, or their alkali metal or alkanolamino salts, in which the substituted group is either morpholino, hydroxyethyl, methylamino, dihydroxyethylamino or methylamino. The structure of the acid form is shown in FIG. 1.

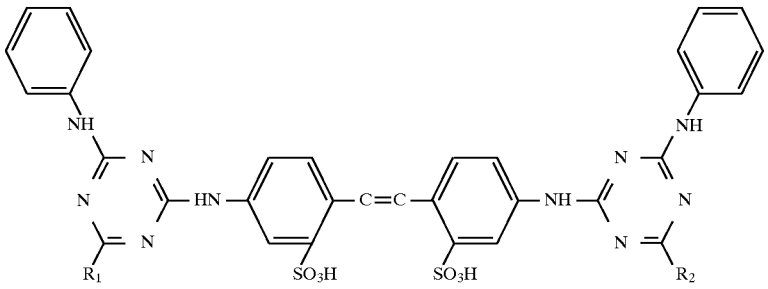

FIG. 1

The fluorescent whitening agents most preferably used are those in which $R_1$ and $R_2$ are morpholino as in Tinopal AMS (ex Ciba-Geigy), $R_1$ and $R_2$ are hydroxyethylmethylamino as in Tinopal 5BM (ex Ciba-Geigy), or $R_1$ and $R_2$ are dihydroxyethylamino as in Tinopal UNPA (ex Ciba-Geigy). Other fluorescent whitening agents suitable for use in this invention include the naphthotriazolylstilbene type sold under the trade name Tinopal RBS (ex Ciba-Geigy) or the diphenyl-triazolylstilbene- (Phorwite BHC (ex Mobay)) or distyrylbiphenyl-type (Tinopal CBS-X (ex Ciba-Geigy)) florescent whiteners. The fluorescent whitening agents described above are used in amounts of from about 0.001% to about 2% by weight of the total formula. Preferred fluorescent whitening agent use levels are from about 0.01% to about 0.5% and may include either a single fluorescent whitener or a mixture of the fluorescent whiteners described above.

Minor Components

Suitable for use within the scope of this invention are a number of heavy duty detergent additives, collectively referred to as "minor additives." These are ingredients that, while present in minor amounts, can contribute significantly to the performance and marketability of detergent products. Among the minor components that can be used in this invention are foam control agents, thickeners (such as cellulose ethers), opacifiers (such as polystyrene latices), bluing agents, colorants, preservatives, processing aids, and perfumes. In addition, optional performance enhancement components may be included, often in larger amounts. These include bleaching agents, such as inorganic peroxy compounds and activators, soil shield agents, antiredeposition or soil suspending materials and other optional performance components.

Formula Preparation

The preparation method for these liquid laundry detergent systems comprises a two mix process involving a main mix and a premix. The main mix includes the batch water plus all or part of the hydrotrope, builder, anionic active(s), enzyme stabilizing system and minor ingredients such as colorants, etc. These components are stirred and heated (either directly or through the heat of neutralization of the anionic active) to a temperature not to exceed about 140° F. Part of the alkalinity/buffering agents may optionally be added to the main batch.

The premix comprises the nonionic active plus the fluorescent dyes and may optionally contain part or all of the hydrotrope and some minor components such as the foam control agents. In its preferred form the premix contains part or all of the alkalinity agents. The premix is heated to a temperature between about 140° to 160° F. with stirring to disperse the fluorescent dyes. The premix is then added to the main batch mix with sufficient stirring to ensure that a uniform mixture is achieved. The main batch mix thus prepared is then cooled to 100° F. or below before addition of enzyme(s) and fragrance(s).

EXAMPLES

The following compositions are used to illustrate the invention. All components are given in terms of weight percent of 100% active material unless specified otherwise.

| | Composition Number I |
|---|---|
| NaLAS-Sodium salt of a linear alkylbenzene sulfonic acid, where the alkyl chain length averages 11 carbon atoms | 10 |
| NaLES-Sodium salt of the sulfated condensation product of one mole $C_{12}$–$C_{15}$ alcohol with an average of 3 moles ethylene oxide | 6 |
| Ethoxylated $C_{12}$–$C_{15}$ alcohol, where the average number of ethoxylated groups per mole is 9 | 8 |
| Ethanol | 0.8 |
| Triethanolamine | 2 |
| Monoethanolamine | 2 |
| Propyl Glycol | 4 |
| Borax Pentahydrate | 3.06 |
| Calcium Ion (+2) | 0.01 |

-continued

| | Composition Number I |
|---|---|
| Sodium Citrate Dihydrate | 7 |
| Alkaline Protease[1] | 1.0 |
| Water and Miscellaneous Ingredients[2] | to 100 |

[1]Savinase 0.8L ® supplied by Novo Laboratories.
[2]Includes colorants, perfume, fatty acid, opacifier, and fluorescent whiteners.

Comparative Compositions 1 and 2 are enzyme-containing, commercially available liquid laundry detergents believed to have the components and levels indicated. Comparative Composition 3 is a commercially available, built liquid detergent which does not incorporate enzymes.

| | Comparative Compositions | | |
|---|---|---|---|
| | 1 | 2 | 3 |
| NaLAS | 8.9 | 3.6 | 17 |
| NaLES (about 2.5 ethylene oxide units) | 12.8 | 0 | 0 |
| Potassium salt a $C_{12}$–$C_{14}$ Fatty Acid | 13.1 | 0 | 0 |
| Ethoxylated $C_{12}$–$C_{15}$ Alcohol with an average of 8–9 ethoxylated groups per molecule | 5.9 | 16.5 | 7 |
| Monoethanolamine | 1.0 | 0 | 2 |
| Propylene Glycol | 4.2 | 0 | 0 |
| Sodium Citrate Dihydrate | 6.0 | 0 | 10 |
| Cationic Surfactants | 1.0 | 0 | 0 |
| Ethanol | 8.5 | 5.1 | 0 |
| Alkaline Protease[3] | 0.52 | 0.49 | 0 |
| Amylase[4] | 0.32 | 0.15 | 0 |
| Water, Miscellaneous ingredients | to 100%[5] | to 100%[6] | to 100%[7] |

[3]Based on Alcalase 2.5L ®, Novo Laboratories.
[4]Based on Termamyl ®, Novo Laboratories, having an activity of 134 KNU/g.
[5]Includes calcium chloride, sodium formate, colorant, perfume, EDTA, fluorescent whiteners.
[6]Includes a sodium carboxylate, polymer, colorants, perfume and fluorescent whiteners.
[7]Includes colorants, perfume, fatty acid, fluorescent whiteners and opacifier.

Prior to the invention described herein, no built, high pH (above 8.5–9.0), enzyme-containing liquid detergents have been commercially available, primarily because enzyme stability at such pH's is inadequate. Tests for enzyme stability in liquid laundry detergents involve storage at an elevated temperature for several weeks. The enzyme stability is the percentage of the initial enzyme activity remaining after such a storage condition. As shown below, the stability of the protease in Composition I is superior to that of comparative Composition 1, despite the higher pH of Composition I (10.1, as opposed to 8.3 for comparative Composition 1):

TABLE 1

Proteolytic Enzyme Stability After 4 Weeks at 105° F.

| Composition Number | % of Initial Activity Remaining |
|---|---|
| I | 38 |
| 1 (comparative) | 14 |

Enzyme efficacy and stability can also be evaluated by washing protease-sensitive test cloths. The results below were obtained by washing test cloths containing casein (dry milk) in a Terg-o-tometer® (U.S. Testing) at 60 ppm hardness (2 Ca:1 Mg) at 100° F. The detergencies were obtained from reflectance, R, measurements done on the unsoiled cloth, soiled cloth, and washed cloth:

TABLE 2

$$\% \text{ Detergency} = \frac{R \text{ washed} - R \text{ soiled}}{R \text{ unsoiled} - R \text{ soiled}} \times 100$$

| Composition | Storage Condition | % Detergency on Casein Cloth |
|---|---|---|
| I | Room Temperature | 68 |
| | 4 weeks, 105° F. | 70 |
| 1 (comparative) | Room Temperature | 44 |
| | 4 weeks, 105° F. | 18 |
| 2 (comparative) | Room Temperature | 34 |
| 3 (comparative) | Room Temperature | 23 |

Even after 4 weeks aging at 105° F., the performance of the composition of this invention was equal to or better than that of any of the competitive formulas kept at room temperature. After 4 weeks at 105° F., Comparative Composition 1 was equal to or poorer than comparative Composition 3, which did not include enzymes.

A product which gives higher pH washing conditions and greater alkaline buffer capacity is desirable for two reasons: the alkaline proteases currently available perform better in alkaline wash pH's, and alkaline wash conditions help to deterge fatty soils from the substrates. Consequently, formulations which have a buffer capacity yielding pH's at and above 8.5 at a dilution of 0.2% (wt.) product in water are desirable. This dilution is typical of wash doses for most liquid laundry detergents.

Compositions II—VII further illustrate the invention. All have active and builder systems equal to that of Composition I, although other ratios and levels can provide similar results. To compare the formulations, all miscellaneous ingredients were the same as for Composition I. Comparative Composition 4, not in accordance with the invention, is also given.

TABLE 3

| | Composition Number | | | | | | |
|---|---|---|---|---|---|---|---|
| | II | III | IV | V | VI | VII | Comparative 4 |
| Triethanolamine | 3 | 2 | 2 | 0 | 0 | 1 | 0 |
| Monoethanolamine | 2 | 2 | 2 | 2 | 2 | 1 | 0 |
| Propylene Glycol | 4 | 4 | 4 | 4 | 4 | 4 | 4 |
| Borax Pentahydrate | 3.06 | 2.70 | 2.30 | 2.30 | 1.53 | 2.30 | 1.53 |
| Calcium Ion | 0.01 | 0.01 | 0.01 | 0.01 | 0.01 | 0.01 | 0.01 |
| *Alkaline Protease | 1.0 | 1.0 | 1.0 | 1.0 | 1.0 | 1.0 | 1.0 |

*Savinase 8.0L ® supplied by Novo Laboratories

It is known that many commercial alkaline proteases have optimal efficiency at wash pH's above 8.5. It is beneficial to incorporate enough alkalinity reserve into the formula to maintain a relatively high pH when diluted to about a 0.2% solution in water. The buffer capacity is measured by titrating a 0.2% solution to pH 7 with 0.10 N HCl, then determining the equivalent weight of $Na_2O$ that the number of moles of HCl would neutralize. The weight of $Na_2O$ is divided by the weight of the product (2.000 g for a 1 liter titration) and then multiplied by 100 to give the percent $Na_2O$ in the formula. The values for compositions I–VII and comparative Compositions 1–4 are given in Table 4.

TABLE 4

| Composition Number | pH of Neat Liquid | pH of 2.0% (wt.) Solution | Alkalinity Reserve to pH 7.00 (% $Na_2O$) |
|---|---|---|---|
| I | 10.1 | 9.1 | 1.7 |
| 1 (comparative) | 8.3 | 7.8 | 0.37 |
| 2 (comparative) | 6.8 | 5.9 | 0[8] |
| 3 (comparative) (no enzymes) | 11.2 | 9.6 | 0.82 |
| II | 10.3 | 9.5 | 2.0 |
| III | 10.4 | 9.1 | 1.7 |
| IV | 10.4 | 9.0 | 1.6 |
| V | 10.3 | 9.4 | 1.2 |
| VI | 9.8 | 8.7 | 0.73 |
| VII | 9.7 | 8.7 | 0.93 |
| 4 (comparative) | 9.2 | 8.5 | 0.23 |

[8]The alkalinity reserve of Comparative Composition 2 is 0 because its solution pH is less than 7.

The alkalinity reserve is most important on soils which contain natural oils and fatty acids. They are hydrolyzed at high pH's, but this causes the wash pH to drop. High levels of alkalinity reserve, such as those in the compositions of the invention (I–VII) and the non-enzymatic liquid (3), provide significant benefits on such soils. Evaluations of these detergents on fatty acid/vacuum cleaner dust shown in Table 5 demonstrate this trend.

Also seen in Table 5 is the effect of the pH of the wash solution on the enzyme efficacy dramatically demonstrated in wash results obtained on the casein test cloths. The casein test cloths did not cause the pH to change as substantially as the fatty acid cloths.

TABLE 5

| Composition Number | Fatty Acid/Vacuum Cleaner Dust Cloth | Casein Test Cloth |
|---|---|---|
| I | 43 | 76 |
| 1 (comparative) | 29 | 44 |
| 2 (comparative) | 12 | 34 |
| 3 (comparative) | 38 | 18 |
| II | 43 | 69 |
| III | 43 | 68 |
| IV | 45 | 70 |
| V | 39 | 63 |
| VI | 30 | 58 |
| VII | 35 | 55 |
| 4 (comparative) | 19 | 36 |

These data show that Compositions I–V according to the invention are significantly superior to the commercial products on at least one of the test cloths and equal on the other. These formulas represent the preferred compositions of this invention. While Compositions VI–VII show performance equal to or better than the commercial products, it is the high pH of these neat enzyme containing liquids that distinguishes them from the less desirable liquids with lower, near-neutral pH's. The higher neat pH is important for removing fatty soils in a pretreat situation. Comparative Composition 3 does have substantial alkalinity reserve, but its lack of an enzyme prevents significant casein test cloth cleaning. Comparison formula 4 does not have the reserve alkalinity of the compositions of the invention. While it does show modest enzyme cleaning performance, its fatty acid/vacuum cleaner dust test cloth results are poor. While markedly inferior to the compositions described by this invention, even Composition 4 is in many respects superior to Composition 2, one of the commercial enzyme products.

Only Compositions I–VII and comparison Composition 3 have neat liquid pH's of above 9.5 or greater, 0.2% aqueous solution pH's of at least 8.5, and alkalinity reserves at pH 7.0 above 0.5% $Na_2O$. Composition 3 has no enzyme; if enzyme were added its activity would fall to near zero after only a few days storage. Compositions I–VII have the unique combination of high alkalinity, high alkalinity reserve, and enzyme effectiveness that this invention describes.

Compositions VIII and IX using sodium carbonate as alkalinity source were prepared having the following formulas:

| | Composition Number | |
|---|---|---|
| | VIII | IX |
| NaLAS-Sodium salt of a linear alkylbenzene sulfonic acid, where the alkyl chain length averages 11 carbon atoms | 10 | 10 |
| NaLES-Sodium salt of the sulfated condensation product of one mole $C_{12}$–$C_{15}$ alcohol with an average of 3 moles ethylene oxide | 6 | 6 |
| Ethoxylated $C_{12}$–$C_{15}$ alcohol, where the average number of ethoxylated groups per mole is 9 | 8 | 8 |
| Ethanol | 0.8 | 0.8 |
| Triethanolamine | 2 | 2 |
| Monoethanolamine | — | 1 |
| Propylene Glycol | 4 | 4 |
| Borax Pentahydrate | 3.06 | 3.06 |
| Calcium Ion (+2) | 0.01 | 0.01 |
| Sodium Carbonate | 1.0 | 1.0 |
| Sodium Citrate Dihydrate | 7 | 7 |
| Alkaline Protease[1] | 1.0 | 1.0 |
| Water and Miscellaneous[2] Ingredients | to 100 | to 100 |

[1]Savinase 8.0L ® supplied by Novo Laboratories.
[2]Includes colorants, perfume, fatty acid, opacifier, and fluorescent whiteners.

Alkalinity Measurements on Compositions VIII and IX were as follows:

| Composition No. | pH of Neat Liquid | pH of 0.2% (wt) Solution | Alkalinity Reserve to pH 7.00 (% $Na_2O$) |
|---|---|---|---|
| VIII | 9.8 | 8.91 | 1.09 |
| IX | 10.2 | 9.16 | 1.55 |

Enzyme stability testing shows both Compositions VIII and IX to have good stability after storage at elevated temperatures (105° F. for 4 weeks).

It should be understood that the specific forms of the intention herein illustrated and described are intended to be representative only. Changes, including but not limited to those suggested in this specification, may be made in the illustrated embodiments without departing from the clear teachings of the disclosures. Accordingly, reference should be made to the following appended claims in determining the scope of the invention.

What is claimed is:

1. A heavy duty liquid detergent composition comprising:

a) at least one surfactant selected from the group consisting essentially of synthetic anionic detergents, nonionic surfactants, amphoteric surfactants and zwitterionic surfactants, at a level of up to 60% by weight, b) a neat liquid pH of 9.5 or greater, c) a solution pH of 8.5 or greater at 0.2% weight use level, d) titratable alkalinity of at least 0.5% weight per gram of product when expressed as % $Na_2O$ as measured to pH 7.

e) an effective level of from 0.001% to 10% by weight of at least one alkaline protease capable of providing stain removal in a wash solution of pH 8.5 or greater, f) an effective enzyme stability system including components selected from the group consisting of i) about 0.1 to about 8% by weight of polyol, ii) 0.1 to 10% by weight of a boron compound selected from the group consisting of boric oxide, boric acid and alkali metal borates, iii) from about 0.0001% to about 1% by weight, calcium ion, over and above any metal ion present in the enzyme, iv) 0.5 to 10% of alkanolamine and v) mixtures thereof, and g) 5–80% water, said heavy duty detergent exhibiting at least 25% of initial enzyme activity after 2 weeks at 105° F., all weights being based on total product.

2. The heavy-duty liquid of claim 1 wherein said alkanolamine comprises at least 0.2% weight monoethanolamine buffer.

3. The heavy-duty liquid of claim 1 wherein the surfactant includes anionic and nonionic surfactants in a ratio of 1:1 to 10:1.

4. The heavy-duty liquid of claim 1 wherein the neat liquid pH is about 10 or above.

5. The composition of claim 1 wherein the liquid is isotropic.

6. The composition of claim 1 wherein said protease is selected from the group consisting of Alcalase®, Savinase®, Maxatase®, and Maxacal®.

7. The composition of claim 1 wherein said protease is selected from the group consisting of Savinase and Maxacal.

8. The composition of claim 1 wherein the formulation is essentially phosphate-free.

9. The composition of claim 1 further comprising from about 3 to about 40% of builder.

10. The composition of claim 2 further comprising from about 3 to about 40% builder.

11. The composition of claim 1 having a protease activity of 0.001 to 1 kilo Novo Protease Units per gram of product.

12. The composition of claim 1 wherein the surfactant is an anionic selected from the group consisting of alkylaryl sulfonates and alcohol ethoxy sulfates.

13. The composition of claim 1 wherein the stabilizers are selected from and boric acid.

14. The composition of claim 1 wherein the stabilizer is calcium ion.

15. The composition of claim 1 wherein the stabilizer is borax.

16. The composition of claim 1 wherein the stabilizer is a polyol selected from the group consisting of propylene glycol, ethylene glycol, glycerine and mixtures thereof.

17. The heavy duty liquid detergent composition of claim 1 wherein the composition is essentially free of pentaborates.

18. A heavy duty liquid detergent comprising:

a) anionic surfactants consisting essentially of synthetic detergents said anionic surfactants being present at a level of 10–25%, b) 2–12% nonionic surfactant, c) 0.5 to 10% monoethanolamine, diethanolamine, triethanolamine or mixtures thereof, d) a neat liquid pH of 9.5 or greater, e) a solution pH of 8.5 or greater at 0.2% weight use level, f) 3 to 25% builder, g) titratable alkalinity of at least 0.5% weight per gram of product when expressed as % $Na_2O$ as measured to pH 7, h) from 1–8% of a polyhydric alcohol selected from the group consisting of propylene glycol, ethylene glycol, and glycerine, i) an effective level of enzymes to provide stain removal including at least one alkaline protease at an activity of 0.001 to 1 KNPU per gram of product capable of providing stain removal in a wash solution of pH 8.5 or greater at a 0.2% wt. use level, j) from 0.1 to 10% borax, boric acid or mixtures thereof, and k) 5–80% water.

19. The heavy duty liquid of claim 18 comprising 0.2 to 5% weight monoethanolamine.

20. The heavy duty liquid of claim 18 further comprising from about 0.5% to about 25% of an alkali metal carbonate.

21. The heavy duty liquid of claim 18 further comprising from about 0.5% to about 25% of an alkali metal silicate.

22. An amine-free heavy duty liquid detergent comprising:

a) surfactants selected from the group consisting essentially of synthetic anionic detergents, nonionic surfactants, amphoteric surfactants and zwitterionic surfactants, b) a neat liquid pH of 9.5 or greater, c) a solution pH of 8.5 or greater at 0.2% weight use level, d) titratable alkalinity of at least 0.5% weight per gram of product when expressed as % $Na_2O$ as measured to pH 7, e) an effective level of from 0.001% to 10% by weight of an enzyme to provide stain removal including at least one alkaline protease capable of providing stain removal in a wash solution of pH 8.5 or greater, f) an effective enzyme stability system including components selected from the group consisting of i) about 0.1% to about 8% by weight of a polyhydric alcohol, ii) 0.1 to 10% by weight of a boron compound selected from the group consisting of boric oxide, boric acid and alkali metal borates, iii) from about 0.0001% to about 1% by weight calcium ion, and iv) mixtures thereof, and g) 5–80% water, said heavy duty detergent exhibiting at least 25% of initial enzyme activity after 2 weeks at 105° F.

23. The heavy duty liquid of claim 22 further comprising from about 0.5% to about 25% of an alkali metal carbonate.

24. The heavy duty liquid of claim 22 further comprising from about 0.5% to about 25% of an alkali metal silicate.

25. The composition of claim 22 wherein the stabilizers are selected from borax or boric acid.

26. The composition of claim 22 wherein the stabilizer is calcium ion.

27. The composition of claim 22 wherein the stabilizer is borax.

28. The composition of claim 22 wherein the stabilizer is a polyol selected from the group consisting of propylene glycol, ethylene glycol, glycerine and mixtures thereof.

29. The composition of claim 22 wherein the polyhydric alcohol is propylene glycol.

30. A heavy duty liquid detergent comprising:

a) surfactant at a level of up to 60% by weight, of which about 1–30% comprise anionic surfactants, said anionic surfactants consisting essentially of synthetic detergents.

b) a neat liquid pH of 9.5 or greater, c) a solution pH of 8.5 or greater at 0.2% weight use level, d) titratable alkalinity of at least 0.5% weight per gram of product when expressed as % $Na_2O$ as measured to pH 7, e) an effective level of from 0.001% to 10% by weight of an enzyme to provide stain removal including at least one alkaline protease capable of providing stain removal in a wash solution of pH 8.5 or greater, f) an effective enzyme stability system including components selected from the group consisting of i) about 0.1% to about 8% by weight of a polyhydric alcohol, ii) 0.1 to 10% by weight of a boron compound other than pentaborate selected from the group consisting of boric oxide, boric acid and alkali metal tetra borates, iii) from about 0.0001% by weight over and above any metal ion present in the enzyme calcium ion, and iv) 0.5 to 10% of alkanolamines and g) 5–80% water, said heavy duty detergent exhibiting at least 25% of initial enzyme activity after 2 weeks at 105° F.

31. The heavy duty liquid detergent of claim 30 wherein the composition is essentially free of pentaborates.

* * * * *